(12) United States Patent
Kato et al.

(10) Patent No.: US 12,488,520 B2
(45) Date of Patent: Dec. 2, 2025

(54) CONSENSUS BUILDING SUPPORT SYSTEM

(71) Applicants: Hitachi, Ltd., Tokyo (JP); Kyoto University, Kyoto (JP)

(72) Inventors: Takeshi Kato, Kyoto (JP); Misa Miyakoshi, Tokyo (JP); Yasuhiro Asa, Tokyo (JP); Yasuyuki Kudo, Tokyo (JP); Junichi Miyakoshi, Tokyo (JP)

(73) Assignees: Hitachi, Ltd., Tokyo (JP); Kyoto University, Kyoto (JP)

( * ) Notice: Subject to any disclaimer, the term of this patent is extended or adjusted under 35 U.S.C. 154(b) by 297 days.

(21) Appl. No.: 18/033,870

(22) PCT Filed: Jan. 15, 2021

(86) PCT No.: PCT/JP2021/001335
§ 371 (c)(1),
(2) Date: Apr. 26, 2023

(87) PCT Pub. No.: WO2022/153498
PCT Pub. Date: Jul. 21, 2022

(65) Prior Publication Data
US 2023/0394723 A1   Dec. 7, 2023

(51) Int. Cl.
*G06T 11/20* (2006.01)
*G06Q 10/06* (2023.01)

(52) U.S. Cl.
CPC ............ *G06T 11/206* (2013.01); *G06Q 10/06* (2013.01); *G06T 11/203* (2013.01)

(58) Field of Classification Search
CPC .... G06T 11/206; G06T 11/203; G06Q 10/206
See application file for complete search history.

(56) References Cited

U.S. PATENT DOCUMENTS

2020/0210056 A1\* 7/2020 Steppan .................. G06F 30/00
2021/0089579 A1\* 3/2021 Shu .......................... H04L 51/02

FOREIGN PATENT DOCUMENTS

JP   2007-041652 A   2/2007

OTHER PUBLICATIONS

Mathematica, "How to plot ternary density plots?", https://mathematica.stackexchange.com/questions/39733/how-to-plot-ternary-density-plots. 2014 (Year: 2014).\*

(Continued)

*Primary Examiner* — Michelle L Sams
(74) *Attorney, Agent, or Firm* — Procopio, Cory, Hargreaves & Savitch LLP

(57) ABSTRACT

Consensus building is supported by providing multiple values to a consensus building process with good visibility. A consensus building support system includes: a graph generation unit configured to generate a ternary graph based on options regarding ternary values; an acquisition unit configured to acquire at least one of individual opinions about the options or a group opinion which is an aggregation of a plurality of individual opinions; and a display unit configured to display, on the ternary graph, a triangle formed by three line segments indicating the individual opinions or the group opinions regarding each of the ternary values by indicating each of the individual opinions or the group opinions regarding the ternary values with one line segment.

12 Claims, 13 Drawing Sheets

(56) References Cited

OTHER PUBLICATIONS

Datavizcatalogue, "Density Plot", https://datavizcatalogue.com/methods/density_plot.html, Mar. 22, 2017. (Year: 2017).*
Superuser.com, "Excel scaling line thickness", https://superuser.com/questions/1426775/excel-scaling-line-thickness, Apr. 17, 2019. (Year: 2019).*
Wikipedia, "Barycentric coordinate system", https://en.wikipedia.org/w/index.php?title=Barycentric_coordinate_system&oldid=997336669, Dec. 31, 2020. (Year: 2020).*
Mathworld, "Ternary Diagram", https://mathworld/wolfram.com/TernaryDiagram.html, 2014. (Year: 2014).*

* cited by examiner

FIG. 8
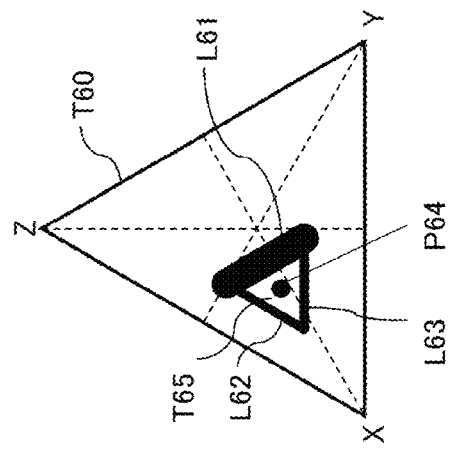
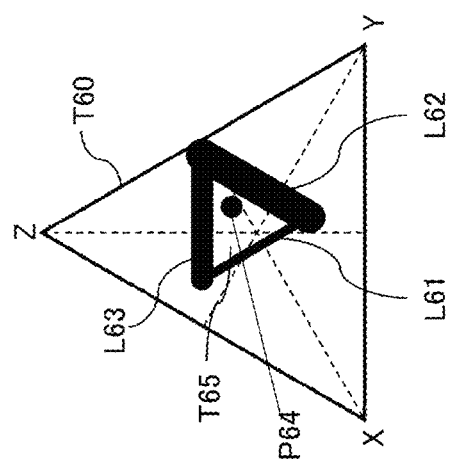
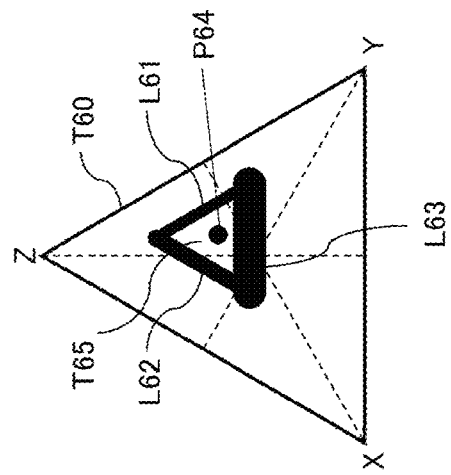

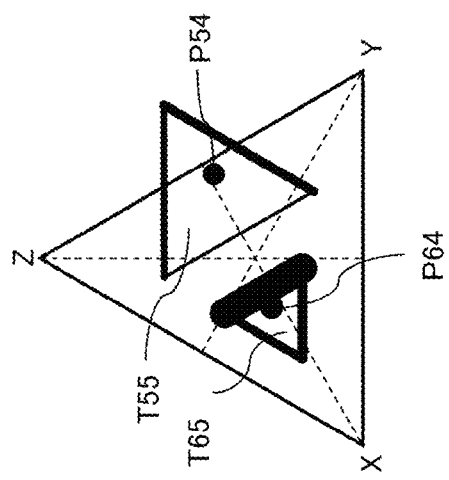
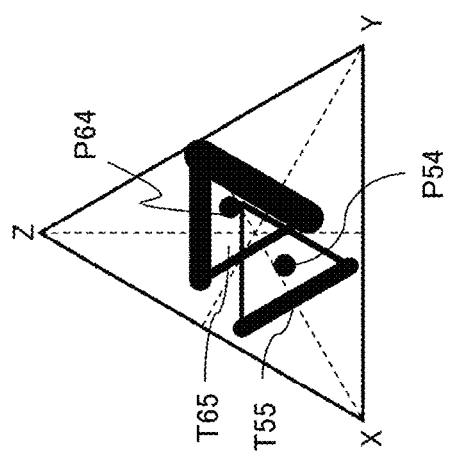
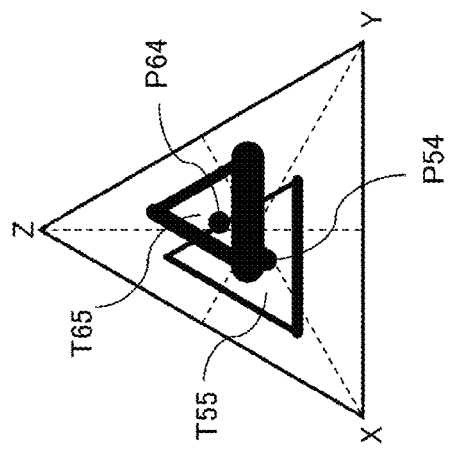
FIG. 9

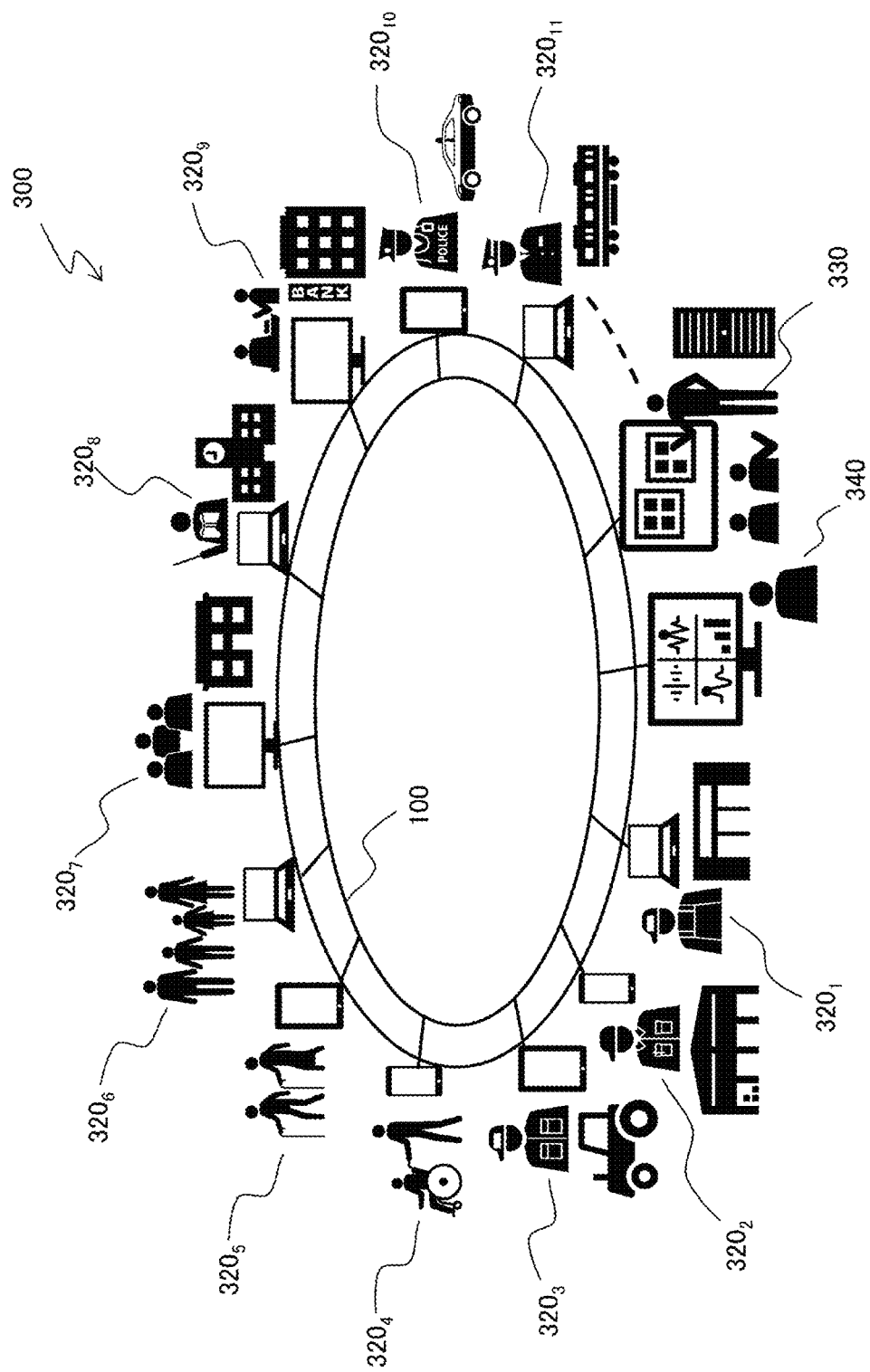

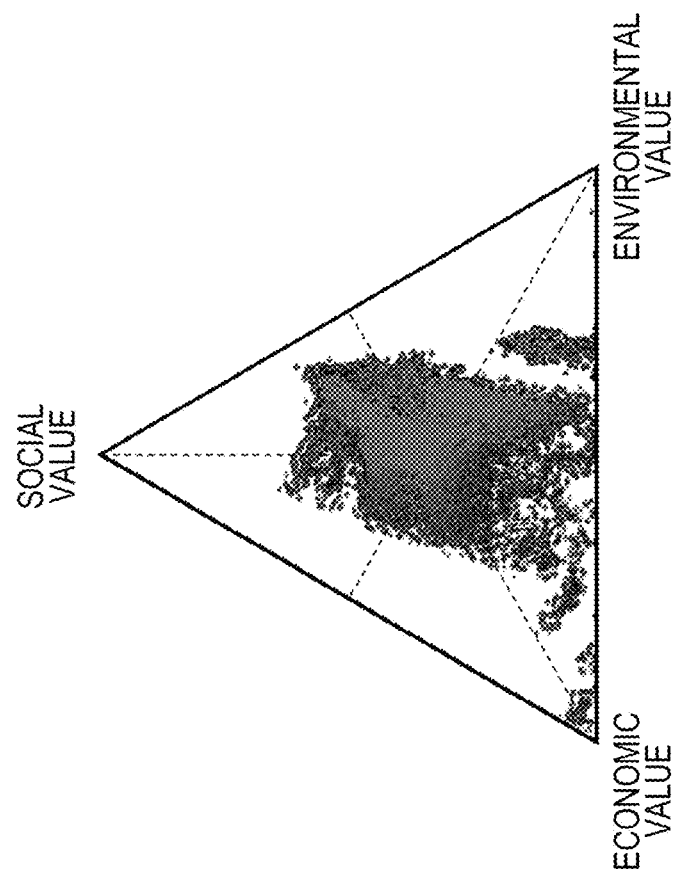

CONSENSUS BUILDING SUPPORT SYSTEM

TECHNICAL FIELD

The present invention relates to a consensus building support system.

BACKGROUND ART

In various countries, regions, and communities, the gap in wealth, inequalities of treatment, environmental pollution, cultural collapse, and the like have become social problems. In order to handle these social problems, it is necessary to consider not only economic values but also multiple values related to human beings, societies, environments, cultures, and the like. In order to solve the social problems, it is necessary to make social choices while achieving consensus building of the stakeholders having diverse values.

In general, in consensus building processes, opinion surveys are carried out by questionnaire or voting in order to perform pre-assessment, ascertain halfway situations, and confirm final consensus, and facilitation for supporting consensus building is performed based on the opinion surveys. In the facilitation, presenting investigation results to the stakeholder in an easy-to-understand manner enhances mutual understanding between the stakeholders and promotes mutual compromise toward consensus achievement.

In the related art, as questionnaire systems and consensus building support systems, a technique of displaying answers to two types of questions on a two-dimensional plane, a technique of displaying allocation points on two types of evaluation axes on a three-dimensional bar graph or a bubble chart on a two-dimensional plane, and the like are known. For example, PTL 1 discloses a technique for displaying individual opinions as three-dimensional vectors.

CITATION LIST

Patent Literature

PTL 1: JP 2007-41652 A

SUMMARY OF INVENTION

Technical Problem

In the display method of the related art in which a two-dimensional plane, a three-dimensional bar graph, or a bubble chart is used, when there are more than two types of questions or evaluation axes, two types of highly relevant questions or evaluation axes are selected and displayed as points, bar graphs, or bubbles on the two-dimensional plane. However, a case where there is mutual interference or a trade-off between display and non-display is not taken into consideration.

In the technique disclosed in PTL 1, individual or means opinions for three evaluation standards are displayed with three-dimensional vectors. However, when many opinions are displayed with three-dimensional vectors on a three-dimensional graph, it cannot be said that visibility is good, and facilitation indicating where a consensus possibility point of a group is present is not taken into consideration.

The present invention has been made in view of such circumstances, and an object of the present invention is to support consensus building by providing multiple values to a consensus building process with high visibility.

Solution to Problem

The present application includes a plurality of means for solving at least some of the above problems, and examples thereof are as follows.

In order to solve the foregoing problems, a consensus building support system according to an aspect of the present invention includes: a graph generation unit configured to generate a ternary graph based on options regarding ternary values; an acquisition unit configured to acquire at least one of individual opinions about the options or a group opinion which is an aggregation of a plurality of individual opinions; and a display unit configured to display, on the ternary graph, a triangle formed by three line segments indicating the individual opinions or the group opinions regarding each of the ternary values by indicating each of the individual opinions or the group opinions regarding the ternary values with one line segment.

Advantageous Effects of Invention

According to an aspect of the present invention, it is possible to provide individual opinions or group opinions regarding multiple values to the consensus building process with high visibility. Accordingly, it possible to support final consensus building, that is, social choices.

Problems, configurations, and advantageous effects other than those described above will be apparent from the following description of embodiments.

BRIEF DESCRIPTION OF DRAWINGS

FIG. 8 is a diagram illustrating a display example of a ternary graph indicating a group opinion.

FIG. 9 is a diagram illustrating a display example of a user I/F for an individual or a group.

FIG. 12 is a diagram illustrating a plurality of examples of a consensus place where the consensus building support system can be adopted.

FIG. 13 is a diagram illustrating an example of a ternary graph on which a calculation simulation result of options regarding ternary values is mapped.

DESCRIPTION OF EMBODIMENTS

Figure 1:
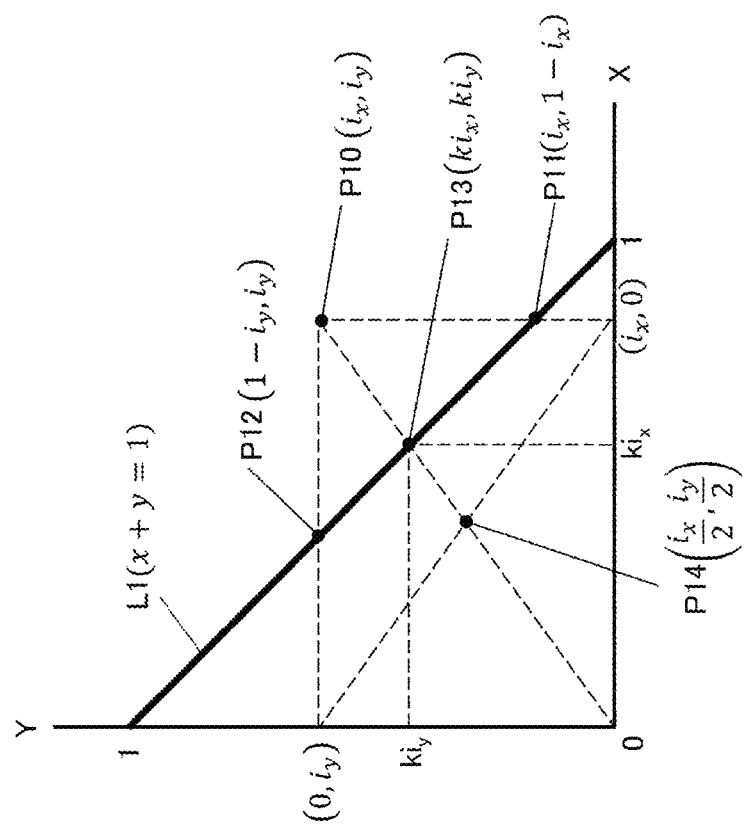
FIG. 1 is a diagram illustrating binary values and a two-dimensional plane for describing a principle of the present invention.

Hereinafter, embodiments of the present invention will be described with reference to the drawings. In all the drawings for describing the present embodiment, the same members are denoted by the same reference numerals in principle, and repeated description thereof will be omitted. In the following embodiments, it goes without saying that the constituents (including element steps) are not necessarily essential unless otherwise specified or considered to be obviously essential in principle. It goes without saying that terms "consisting of A", "formed by A", "having A", and "including A" do not exclude other elements except for a case where it is specifically stated that only the element is included. Similarly, in the following embodiments, when shapes, a positional relationship, and the like of the constituents and the like are mentioned, it is assumed to include those substantially approximate or similar to the shapes and the like unless otherwise specified or unless clearly considered to be otherwise in principle.

Principle of Present Invention

First, in order to understand the principle of the present invention, binary values which are simplest examples of multiple values will be described. FIG. 1 illustrates an example in which binary values are projected to a two-dimensional plane.

The radix options regarding the binary values X and Y are indicated by two variables $v_x$ and $v_y$. First, the variables $v_x$ and $v_y$ are normalized using each maximum value and each minimum value and transformed into $v_x'$ and $v_y'$ by the following equation (1).

[Math. 1]

$$v_x' = \frac{v_x - v_{xmin}}{v_{xmax} - v_{xmin}}, v_y' = \frac{v_y - v_{ymin}}{v_{ymax} - v_{ymin}} \quad (1)$$

Next, the set of two normalized variables ($v_x'$, $v_y'$) is projected to a point ($\kappa v_x'$, $\kappa v_y'$) on the straight line L1: x+y=1 (where 0≤x≤1, 0≤y≤1) on the two-dimensional plane using a coefficient K as shown in the following Expression (2). In this way, various options regarding binary values are indicated on a one-dimensional straight line.

[Math. 2]

$$\kappa \cdot (v_x' + v_y') = 1 \quad (2)$$

In this way, a radix distribution of options is shown on the straight line L1: x+y=1. The options may be discrete or continuous, but a relative density distribution of the options on a one-dimensional straight line can be considered.

Here, it is noted that, for example, both (1, 1) and (0.1, 0.1) are projected as ($v_x'$, $v_y'$) to the same point (0.5, 0.5) on the straight line L1 in a multiple manner. However, if both the points can take large values simultaneously so that the points are projected to the same point (1, 1) on the straight line L1 (if both the points are independent in the first place), the binary values may be treated separately.

If both $v_x'$ and $v_y'$ can take only small values so that $v_x'$ and $v_y'$ are projected to the point (0.1, 0.1) on the straight line L1, a method of taking a value range at the time of normalization should be changed in the first place.

Accordingly, here, there is a trade-off or dilemma in the binary values X and Y, and a case where the range of the ($v_x'$, $v_y'$) is appropriately set is a main target. When selection of an individual or a group is associated with an option in multiple projections ($\kappa v_x'$, $\kappa v_y'$), for example, when an option in which large values of $v_x'$ and $v_y'$ is a desirable option, an option with the largest values of $v_x'$ and $v_y'$ in the multiple projections may be associated.

Next, it is assumed that a selection of an individual for the binary values X and Y (normalized $v_x'$ and $v_y'$), that is, an opinion is expressed by two variables $i_x$ and $i_y$. If $v_x$ and $v_y$ are not normalized, normalization may be performed like with $v_x'$ and $v_y'$.

The variables $i_x$ and $i_y$ are associated with a point P11 ($i_x$, 1-$i_x$) and a point P12 (1-$i_y$, $i_y$) on the straight line L1 illustrated in FIG. 1. The point P10 ($i_x$, $i_y$) is projected to the point P13 (k$i_x$, k$i_y$) on the straight line L1 using the coefficient k as expressed in the following Expression (3). A point P14 is a midpoint and a center of gravity of a line segment connecting a point ($i_x$, 0) on the X axis and a point (0, $i_y$) on the Y axis.

[Math. 3]

$$k \cdot (i_x + i_y) = 1 \quad (3)$$

As indicated in the relationship among the points P10, P13, and P14, the point P13 is a center of gravity generated by $i_x$ and $i_y$, and it can be said that an aggregation point of the individual opinions is projected to the straight line L1. The point P11 indicates an opinion $i_x$ regarding the value X, and the point P12 indicates the opinion $i_y$ regarding the value Y.

Furthermore, when a group opinion (an average value, a median value, or the like) is obtained from a distribution of the individual opinions by collecting individual opinions, an opinion aggregation point, that is, a consensus possibility point, a group opinion regarding the value X, and a group opinion regarding the value XY, can be presented as in the case of the individual opinions.

When there is a weight on the individual or group opinions regarding the binary values X and Y, $i_x$ may be replaced with $m_x i_x$ and $i_y$ may be replaced with $m_y i_y$ in the following Expression (3) with the respective weights $m_x$ and $m_y$ as shown in the following Expression (4).

[Math. 4]

$$k \cdot (m_x i_x + m_y i_y) = 1 \quad (4)$$

In this case, the position of the weighted center of gravity moves between the line segments of the point P11 and the point P12 according to the weights $m_x$ and $m_y$. As the weights $m_x$ and $m_y$, for example, the number of votes in cumulative voting, a Borda count in score voting, or the like can be used. For example, when a group opinion regarding one value is approximated by a normal distribution N ($\mu$, $\sigma^2$) of a total number n, $\mu$ can be used as the opinion regarding the value, and n/$\sigma$ in consideration of the total number n or the degree of aggregation of the opinions can be used as a weight.

As described above, the binary values X and Y are associated with the option indicated on the one-dimensional line segment and an aggregation point of the individual opinions or a consensus possibility point of the group. As described above, when options are multiplexed, a most desirable option may be associated.

A scheme of simplifying the binary values X and Y and handling the binary values X and Y in one-dimensional line segments have been described above. However, the binary values may be displayed on a two-dimensional plane in the first place, and the reason why the binary value has been described above is to understand the principle of simplification of the multiple values.

<Method of Performing Extension to Ternary Values X, Y, and Z>

Figure 2:
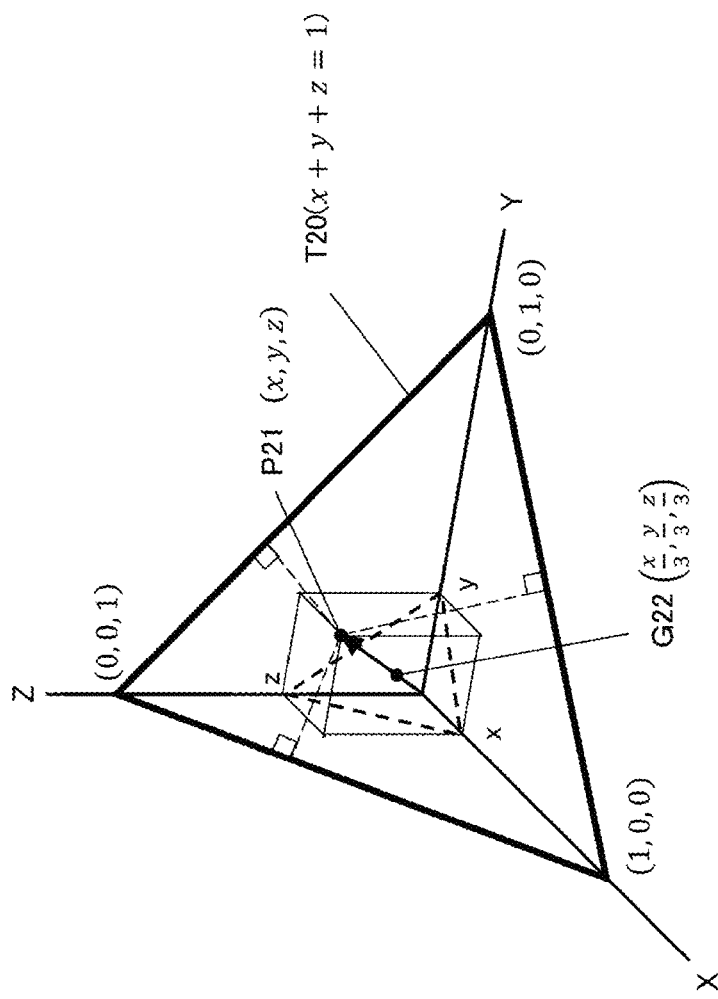
FIG. 2 is a diagram illustrating a ternary graph.

Next, a method of performing extension to the ternary values X, Y, and Z will be described. In order to simplify and handle the ternary values, a ternary graph is used. FIG. 2 illustrates an example of a ternary graph.

As illustrated in FIG. 2, the ternary graph shown on a two-dimensional plane is derived from an equilateral triangle T20 originally represented by x+y+z=1 (where 0≤x≤1, 0≤y≤1, and 0≤z≤1) in a three-dimensional space. A point P21 (X, Y, Z) on the equilateral triangle T20 is obtained by projecting a midpoint of the triangle indicated by the dotted line, that is, the center of gravity G22 (x/3, y/3, z/3) onto the equilateral triangle T20. This is similar to the relationship between the point P14 that is the midpoint, that is, the center of gravity in FIG. 1 and the point P13 on the straight line L1.

As in the case of the binary values, it is assumed that radix options regarding the ternary values X, Y, and Z are indicated by three variables $v_x$, $v_y$, and $v_x$. These variables $v_x$, $v_y$, and $v_x$ are normalized using a maximum value and a minimum value according to the following Expression (5) and are transformed into $v_x'$, $v_y'$, and $v_z'$.

[Math. 5]

$$v_x' = \frac{v_x - v_{xmin}}{v_{xmax} - v_{xmin}}$$

$$v_y' = \frac{v_y - v_{ymin}}{v_{ymax} - v_{ymin}}$$

$$v_z' = \frac{v_z - v_{zmin}}{v_{zmax} - v_{zmin}} \quad (5)$$

The set of normalized variables ($v_x'$, $v_y'$, $v_x'$) is projected to a point ($\kappa v_x'$, $\kappa v_y'$, $\kappa v_x'$) on the equilateral triangle T20 on the three-dimensional plane using the coefficient K as expressed in the following Expression (6).

[Math. 6]

$$\kappa \cdot (v_x' + v_y' + v_z') = 1 \quad (6)$$

As an example, a result of a calculation simulation of the options regarding the ternary values X, Y, and Z projected to a ternary graph is illustrated in FIG. 13. As will be described in detail below, X is an economic value (energy cost ratio), Y is an environmental value (natural energy use rate), and Z is a social value (regional activation rate). In FIG. 13, although emphasized for visibility of illustration, it can be seen that the density of options at the center of the ternary graph is high, and there are few options around (near the maximum value of each axis).

In this way, a tradeoff and a trilemma regarding the ternary values X, Y, and Z can be handled on the ternary graph on the two-dimensional plane. When the radix options are projected on the ternary graph, a distribution of options appears. When a relative density distribution of this distribution is considered, it is easy to find options in a place where the density is high, and it is difficult to find a place where the density is low.

Here, it is assumed that the individual opinions regarding the ternary values X, Y, and Z (the normalized $v_x'$, $v_y'$, $v_x'$) are indicated by three variables $i_x$, $i_y$, and $i_z$. Then, as expression in the following Expression (7), the point ($i_x$, $i_y$, $i_z$) is transformed using the coefficient k and projected to the equilateral triangle T20.

[Math. 7]

$$k \cdot (i_x + i_y + i_z) = 1 \quad (7)$$

Figure 3:
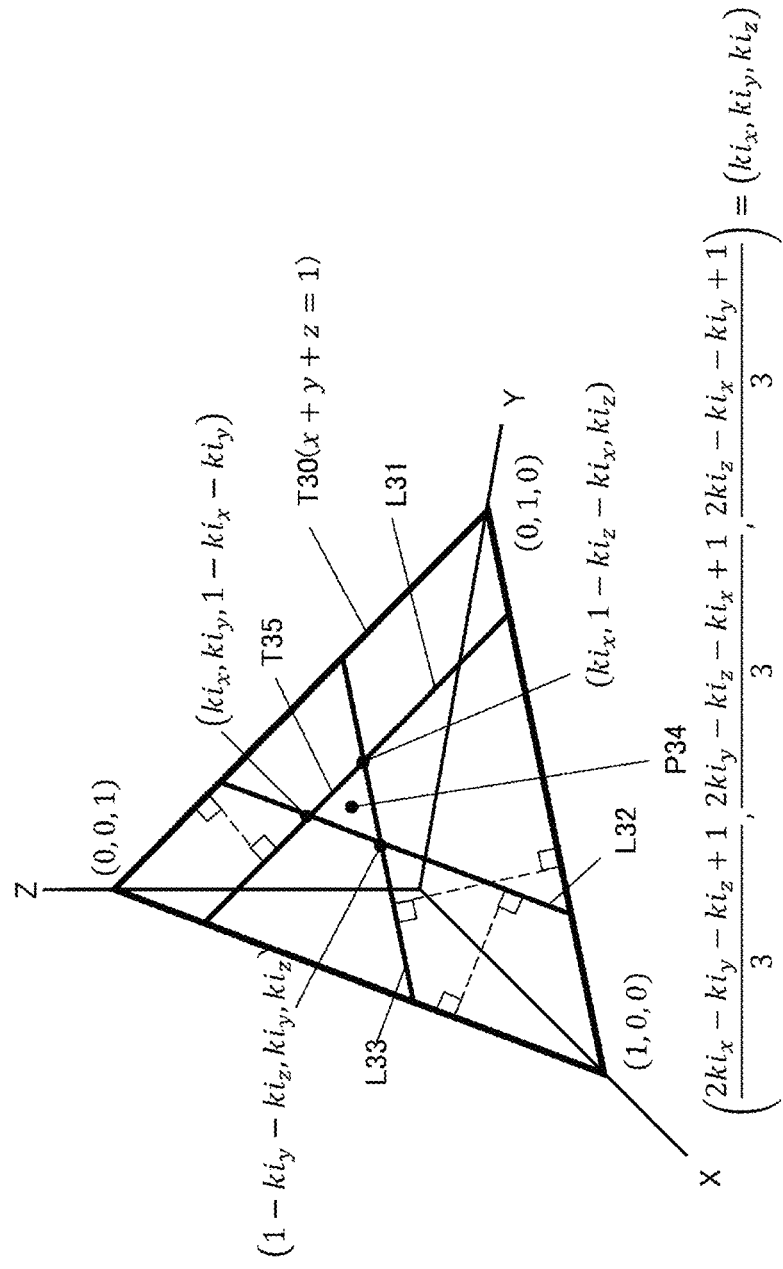
FIG. 3 is a diagram illustrating ternary values and a ternary graph for describing the principle of the present invention.

In FIG. 3, the point ($i_x$, $i_y$, $i_z$) is transformed into ($ki_x$, $ki_y$, $ki_z$) using the coefficient k, and projected to a point P34 on the equilateral triangle T20.

The variables $i_x$, $i_y$, and $i_z$ are associated with intersection lines L31, L32, and L33 between an equilateral triangle T30 and the planes x=$i_x$, y=$i_y$, z=$i_z$. A point P34 is a midpoint and a center of gravity of an equilateral triangle T35 formed by the three lines of intersection lines L31, L32, and L33 (the equilateral triangle is obvious from the fact that the three sides of the equilateral triangle 30 and the intersection lines L31, L32, and L33 are parallel).

In this way, for the ternary values X, Y, and Z as in the binary values X and Y, the point P34 which is an aggregation point of the individual opinions or a consensus possibility point of the group can be shown simply on the equilateral triangle T30: x+y+z=1, that is, the ternary graph which is a two-dimensional plane, and can be associated with the options ($\kappa v_x'$, $\kappa v_y'$, $\kappa v_z'$) expressed on the equilateral triangle.

When there are weights $m_x$, $m_y$, and $m_x$ in the individual or group opinions regarding the ternary values X, Y, and Z, the weighted center of gravity may be obtained, as illustrated in the following Expression (8). The position of the weighted center of gravity moves from the position of the point P34 in the equilateral triangle T35.

[Math. 8]

$$\begin{pmatrix} \frac{2m_x x - m_y y - m_z z + 1}{3}, \\ \frac{2m_y y - m_x x - m_z z + 1}{3}, \\ \frac{2m_z z - m_x x - m_y y + 1}{3} \end{pmatrix} = (km_x x, km_y y, km_z z) \quad (8)$$

$$\downarrow$$

$$(3k-2)m_x x + m_y y + m_z z = 1$$

$$m_x x + (3k-2)m_y y + m_z z = 1$$

$$m_x x + m_y y + (3k-2)m_z z = 1$$

$$\downarrow$$

$$3km_x x + 3km_y y + 3km_z z = 3$$

$$k(m_x x + m_y y + m_z z) = 1$$

The position of the weighted center of gravity including a case where the weights are equal is associated with the density distribution of the radix options on the ternary graph. Accordingly, by obtaining the point P34, it is possible to know how much the individual opinions or the group opinions can be implemented.

A ratio between two of the ternary values X, Y, and Z can also be collected as an individual or group opinion.

Figure 4:
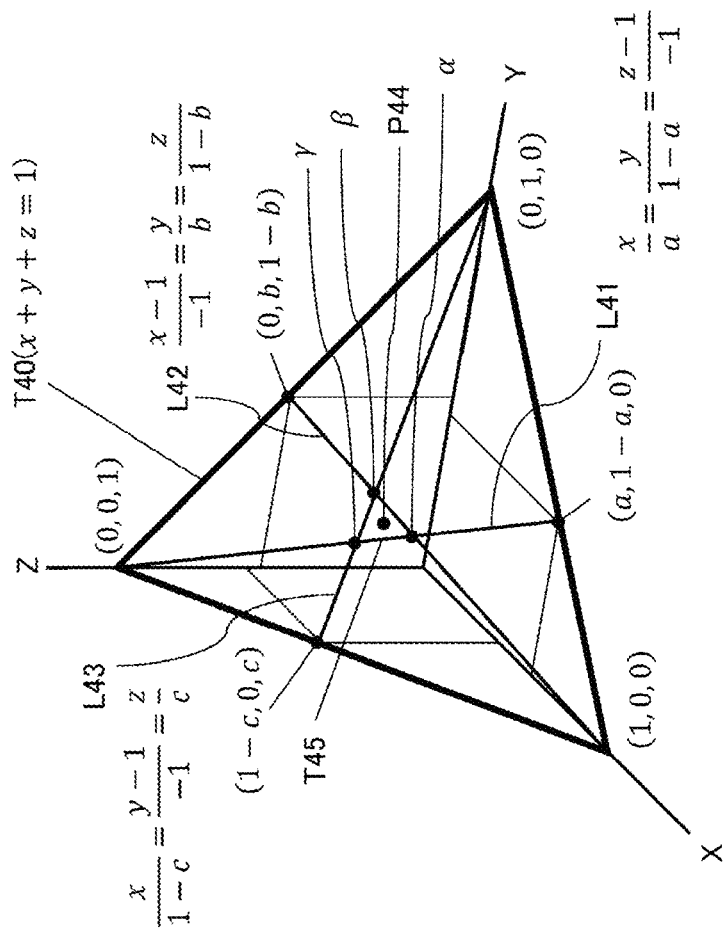
FIG. 4 is a diagram illustrating a ternary graph based on a comparison between two values among the ternary values.

FIG. 4 illustrates a ternary graph based on a comparison between two values among the ternary values. Here, when indicated by $i_x:i_y$=a:(1−a), $i_y:i_x$=b:(1−b), and $i_x:i_x$=c:(1−c), as illustrated in FIG. 4, the ratios are associated with straight lines L41, L42, and L43 on an equilateral triangle T40: x+y+z=1. Then, as expressed in the following Expression (9), a point P44 that is a midpoint and the center of gravity of a triangle T45 formed by the straight lines L41, L42, and L43 is obtained. Even when there is a weight in an individual or group opinion, the weight may be obtained according to the above-described method of calculating the weighted center of gravity.

[Math. 9]

$$\alpha: \left( \frac{ab}{1-a+ab}, \frac{(1-a)b}{1-a+ab}, \frac{(1-a)(1-b)}{1-a+ab} \right) \quad (9)$$

$$\beta: \left( \frac{(1-b)(1-c)}{1-b+bc}, \frac{bc}{1-b+bc}, \frac{(1-b)c}{1-b+bc} \right)$$

$$\gamma: \left( \frac{(1-c)a}{1-c+ca}, \frac{(1-c)(1-a)}{1-c+ca}, \frac{ca}{1-c+ca} \right)$$

$$g: \left( \frac{\alpha_x + \beta_x + \gamma_x}{3}, \frac{\alpha_y + \beta_y + \gamma_y}{3}, \frac{\alpha_z + \beta_z + \gamma_z}{3} \right)$$

When multiple values exceeding ternary values are handled as a multidimensional space, it is not possible in principle to simplify the options on a two-dimensional plane, project the individual or group opinions on a two-dimensional plane, express the degree of aggregation of the individual opinions or a center of gravity of the consensus possibility point of the group, and associate the center of gravity with the options. For example, although it is possible to display the opinions regarding multiple values on a radar chart, various options are expressed in a plurality of polygons on the radar chart, and the center of gravity cannot be expressed on the radar chart. Therefore, the individual or group opinions are simply displayed.

Accordingly, when multiple values exceeding the ternary values are handled, it is desirable to reduce the multiple values to the ternary values.

When the multiple values are handled, there is a risk of overlooking a trade-off between the values when only the binary values are extracted as in the related art. Thus, it is desirable to reduce the multiple values to the ternary values since a cognitive load becomes too large when quaternary values or more are simultaneously considered.

For example, one composite index can be generated from a plurality of value indexes in each value by reducing the multiple values to three types of representative values of a social value, an environmental value, and an economic value in accordance with a certain method. In that case, when three-dimensional information is projected to a two-dimensional plane as in the embodiment to be described below instead of displaying three types of values as a three-dimensional vectors as in the related art, visibility and a cognitive load are taken into consideration.

The principle of the present invention has been described above.

<Consensus Building Support System 100 According to Embodiment of Present Invention>

Figure 5:
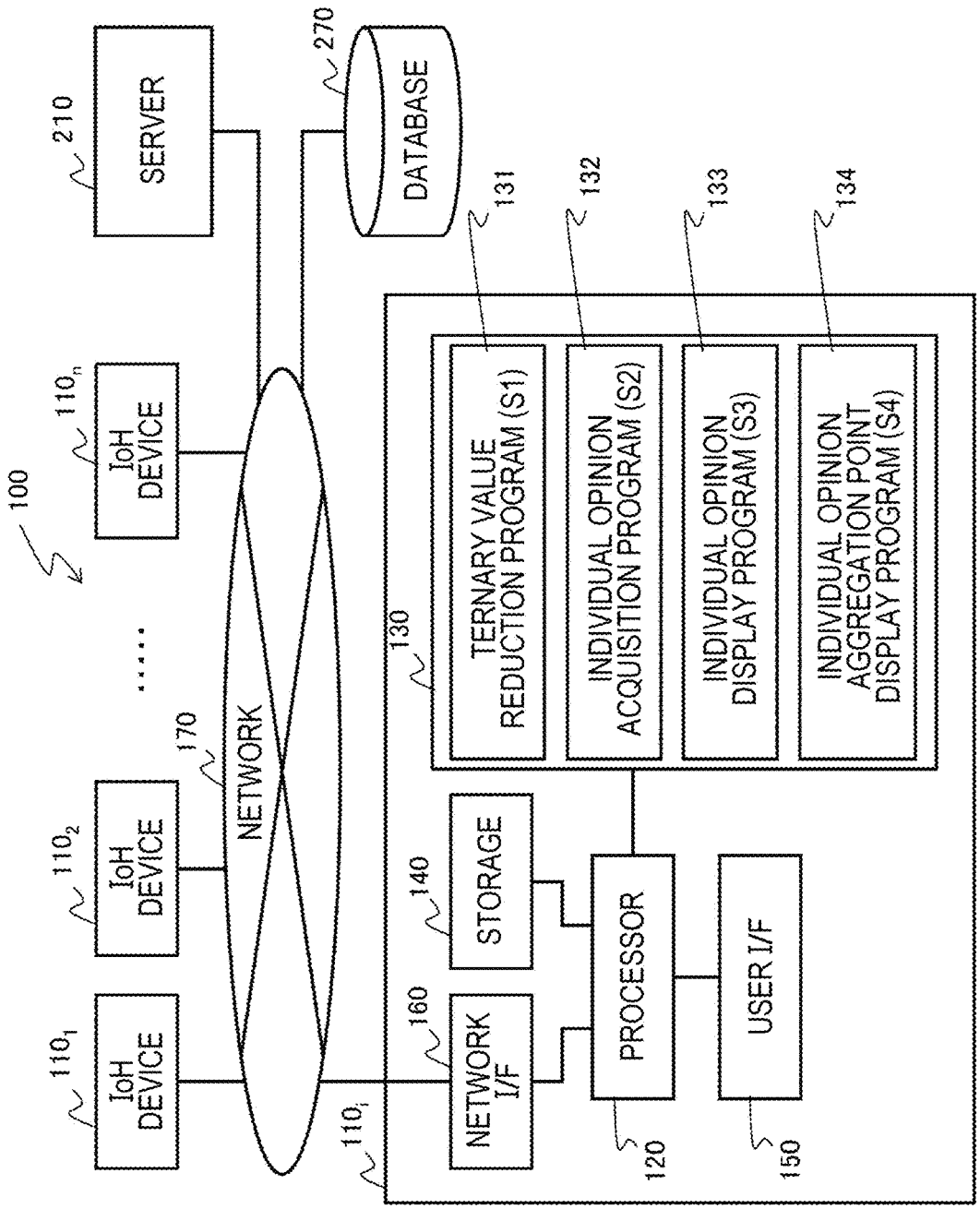
FIG. 5 is a diagram illustrating a configuration example of a consensus building support system according to an embodiment of the present invention.

Next, FIG. 5 illustrates a configuration example of the consensus building support system 100 according to an embodiment of the present invention.

The consensus building support system 100 includes a plurality of Internet of Human (IoH) devices $110_1$ to $110_n$ connected via a network 170. Hereinafter, when it is not necessary to distinguish the IoH devices $110_1$ to $110_n$ separately, the IoH devices $110_1$ to $110_n$ are simply referred to as the IoH devices 110. Further, the IoH device 110 used by an individual i is referred to as an IoH device $110_i$ as necessary.

The IoH device 110 is a device in which a network communication function is added to any of various forms of wearable electronic devices or products such as watches, glasses, and cloth in addition to electronic devices typified by a smartphone, a tablet computer, or the like.

The IoH device 110 includes a processor 120 formed by a central processing unit (CPU) and the like, a memory 130 formed by a dynamic random access memory (DRAM) and the like, a storage 140 formed by a hard disc drive (HDD), a solid state drive (SSD) and the like, a user interface (I/F) 150 formed by a touch panel, a display and the like, and a network I/F 160 formed by a communication module and the like. The IoH device 110 is connected to the server 210 and the database 270 via the network 170 by the network I/F 160.

In the IoH device 110, the ternary value reduction program 131, the individual opinion acquisition program 132, the individual opinion display program 133, and the individual opinion aggregation point display program 134 stored in the storage 140 are read to the memory 130 and executed by the processor 120. In this way, a ternary value reduction process S1, an individual opinion acquisition process S2, an individual opinion display process S3, and an individual opinion aggregation point display process S4 are sequentially executed, and these processing results are displayed on the user I/F 150.

The processor 120 executing the ternary value reduction process S1 corresponds to a graph generation unit according to the present invention. The processor 120 executing the individual opinion acquisition process S2 corresponds to an acquisition unit according to the present invention. The processor 120 executing the individual opinion display process S3 and the individual opinion aggregation point display process S4 corresponds to a display unit according to the present invention.

Figure 6:
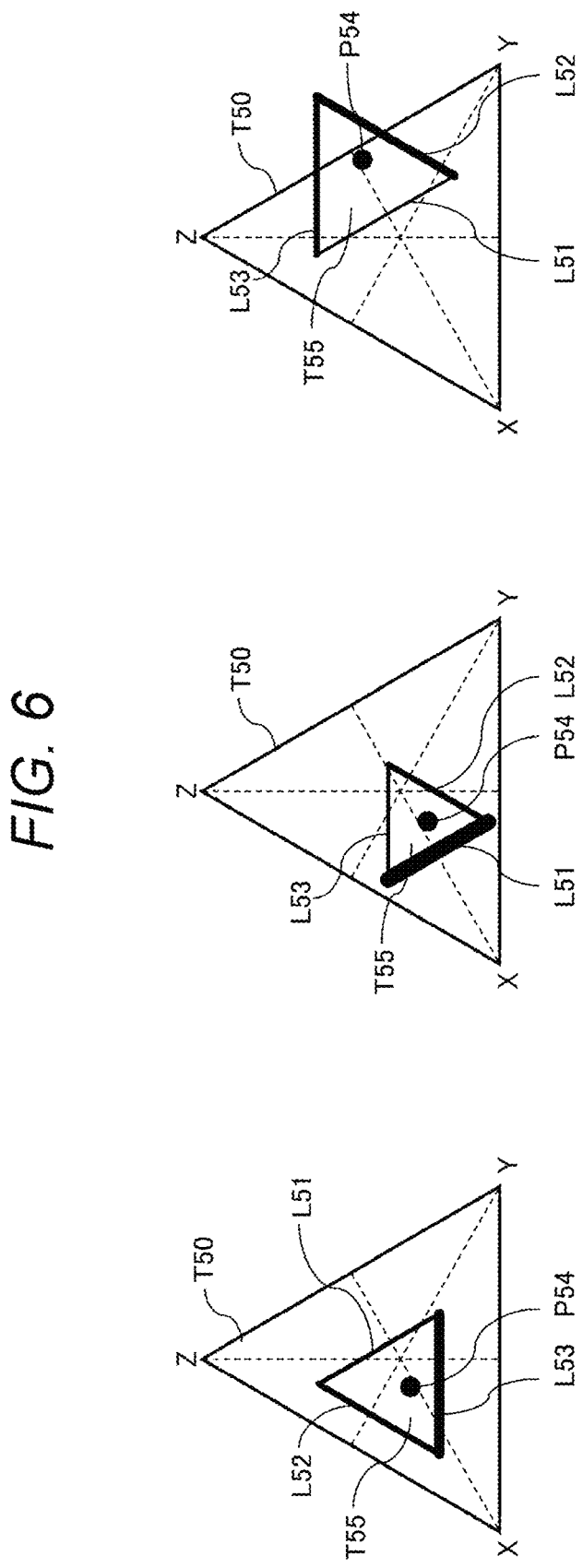
FIG. 6 is a diagram illustrating a display example of a ternary graph indicating individual opinions.

Next, FIG. 6 illustrates three types of display examples of a ternary graph indicating individual opinions displayed on the user I/F 150 of the IoH device 110 in the consensus building support system 100.

First, the ternary values X, Y, and Z are reduced through the ternary value reduction process S1 and are projected to an equilateral triangle (ternary graph) T50. Subsequently, the individual opinions $i_x$, $i_y$, and $i_z$ regarding the ternary values X, Y, and Z are acquired through the individual opinion acquisition process S2. The individual opinions are input via, for example, a user I/F screen 70 (FIG. 10) displayed on the user I/F 150.

Subsequently, in the individual opinion display process S3, an equilateral triangle T55 formed by line segments L51, L52, and L53 corresponding to the individual opinions $i_x$, $i_y$, and $i_z$ is displayed on the ternary graph (the equilateral triangle T50) (the line segments L51, L52, and L53 and the equilateral triangle T55 correspond to the intersection lines L31, L32, and L33 and the equilateral triangle T35 in FIG. 3, respectively). The relative differences in thickness among the line segments L51, L52, and L53 indicate weights of the individual opinions $i_x$, $i_y$, and $i_z$.

Subsequently, P54 which is the center of gravity of the equilateral triangle T55 is displayed through the individual opinion aggregation point display process S4 (this center of gravity corresponds to P34 which is the center of gravity of the equilateral triangle T35 in FIG. 3). The point P54 is a weighted center of gravity expressed in Expression (8). The position of the point P54 is associated with a density distribution of radix options, that is, feasibility of the individual opinions.

When the weights of the individual opinions $i_x$, $i_y$, and $i_z$ are equal to the ternary values X, Y, and Z, the thicknesses of the line segments L51, L52, and L53 become equal to each other, and the position of the point P54 indicating the center of gravity coincides with the midpoint of the equilateral triangle T55.

In addition, according to the individual opinions $i_x$, $i_y$, and $i_z$ regarding the ternary values X, Y, Z, a case where the equilateral triangle T55 erects (the left side in FIG. 6), a case where the equilateral triangle T55 inverts (the middle in FIG. 6), a case where the equilateral triangle T55 protrudes from the equilateral triangle T50 (the right side in FIG. 6), and the like arise. For reference, in the maximum equilateral triangle T55 that can be made by the individual opinions $i_x$, $i_y$, and $i_z$, a maximum value is taken by each of the individual opinions $i_x$, $i_y$, and $i_z$. Therefore, each side becomes an inverted equilateral triangle (not illustrated) passing through the vertexes of the equilateral triangle 50.

As described above, according to the consensus building support system 100, an individual can confirm the positioning (the line segments L51, L52, and L53) of the own opinion and the opinion aggregation point (the point P54) on the ternary graph (equilateral triangle T50) with good visibility, and further refer to the option corresponding to the opinion aggregation point 54 among the options regarding the ternary values X, Y, and Z simplified in the ternary graph.

In the present embodiment, the weights of the individual opinions $i_x$, $i_y$, and $i_z$ are indicated by the differences in the relative thickness of the line segments L51, L52, and L53. However, instead of the thicknesses of the lines, the weights of the individual opinions may be indicated by changing color (hue, lightness, or saturation) such as color or shade of the lines.

Instead of executing the ternary value reduction process S1, the individual opinion acquisition process S2, the individual opinion display process S3, and the individual opinion aggregation point display process S4 in the IoH device 110, these processes may be executed by the server 210, and the processing result may be received and displayed by the IoH device 110.

Figure 7:
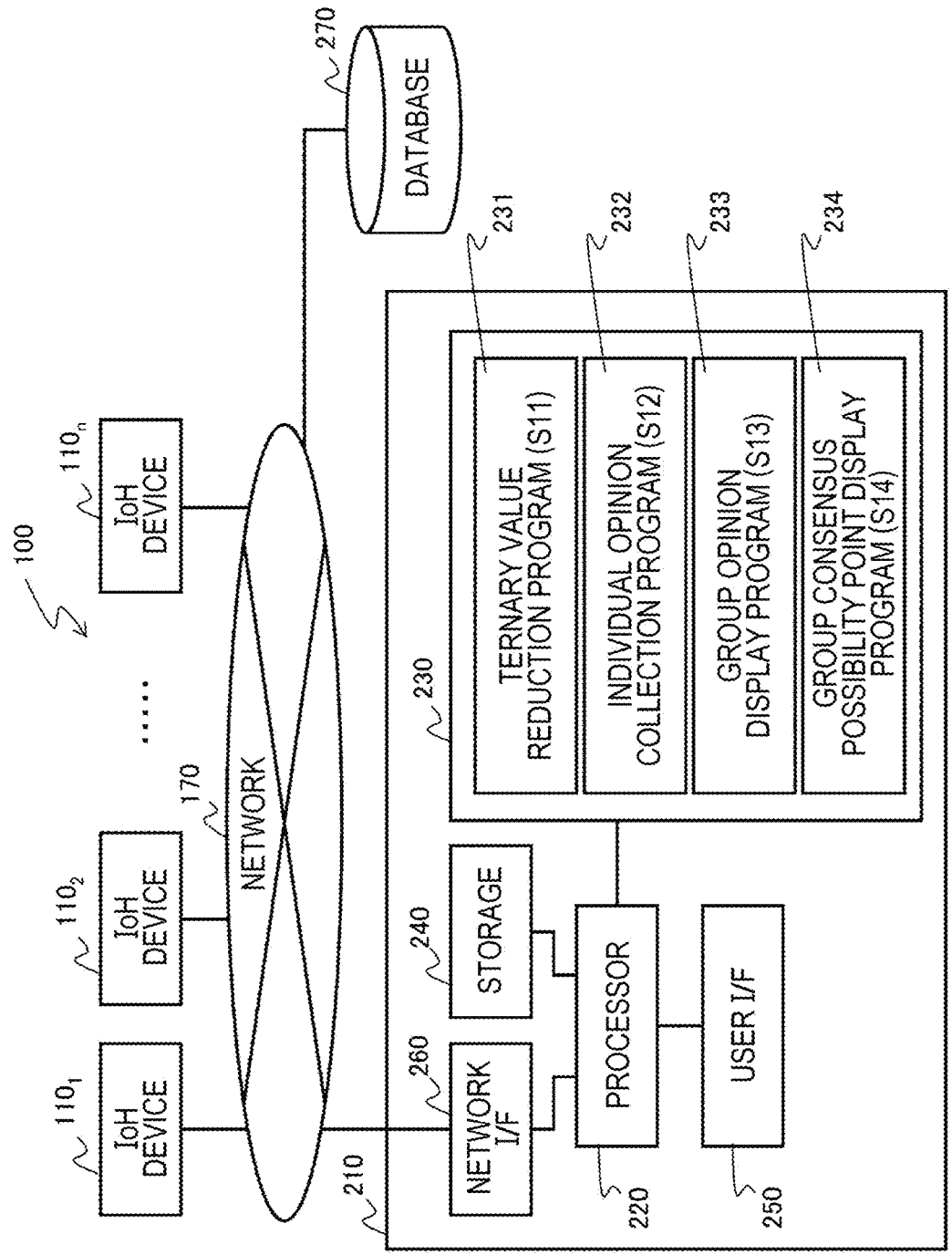
FIG. 7 is a diagram illustrating a configuration example of a server in the consensus building support system.

Next, FIG. 7 illustrates a configuration example of the server 210 in the consensus building support system 100.

Like the configuration example of the IoH device 110 illustrated in FIG. 5, the server 210 includes a processor 220 formed by a CPU and the like, a memory 230 formed by a DRAM and the like, a storage 240 formed by an HDD, an SSD and the like, a user I/F 250 formed by a touch panel, a display and the like, and a network I/F 260 formed by a communication module and the like. The server 210 is connected to the IoH device 110 and the database 270 via the network 170 by the network I/F 260 to communicates various types of data.

In the server 210, a ternary value reduction program 231, an individual opinion collection program 232, a group opinion display program 233, and a group consensus possibility point display program 234 stored in the storage 240 are read to the memory 230 and executed by the processor 220. In this way, the ternary value reduction process S11, the individual opinion collection process S12, the group opinion display process S13, and the group consensus possibility point display process S14 are sequentially executed, and these processing results are displayed on the user I/F 250. These processing results are stored in the database 270 as necessary.

The processor 220 executing the ternary value reduction process S11 corresponds to a graph generation unit of the present invention. The processor 220 executing the individual opinion collection process S12 corresponds to an acquisition unit of the present invention. The processor 220 executing the group opinion display process S13 and the group consensus possibility point display process S14 corresponds to a display unit of the present invention.

Next, FIG. 8 illustrates three types of display examples of a ternary graph indicating group opinions displayed on the user I/F 250 of the server 210 in the consensus building support system 100.

First, the ternary values X, Y, and Z are projected to an equilateral triangle (ternary graph) T60 through the ternary value reduction process S11. Subsequently, the opinions $i_x$, $i_y$, and $i_z$ of the individual i (where I=1 to n) are collected through the individual opinion collection process S12. Each individual opinion is input by, for example, the IoH device 110, is transmitted to the server 210 through the network 170, and is received by the network I/F 260. Subsequently, through the group opinion display process S13, an equilateral triangle T65 formed by line segments L61, L62, and L63 corresponding to group opinions $\mu_x$, $\mu_y$, and $\mu_z$ is displayed on the ternary graph 60. Subsequently, a point P64 which is the center of gravity of the equilateral triangle T65 is displayed through the group consensus possibility point display process S14.

The differences in relative thickness among the line segments L61, L62, and L63 indicate the weights of the group opinions $\mu_x$, $\mu_y$, and $\mu_z$. Instead of the thicknesses of the lines, color (hue, lightness, or saturation) such as color or shade of the lines may be changed to indicate the weights of the group opinions. The point P64 which is the center of gravity of the equilateral triangle T65, is the weighted center of gravity. A position of the point P64 is associated with a density distribution of radix options, and indicates how much the group consensus possibility point can be realized.

Here, the group opinions $\mu_x$, $\mu_y$, and $\mu_z$ are totalization results of the individual opinions $i_x$, $i_y$, and $i_z$ of n individuals. For example, if normal distributions N $(n_x, \mu_x, \sigma_x^2)$, N $(n_y, \mu_y, \sigma_y^2)$, and N $(n_z, \mu_z, \sigma_z^2)$ are obtained for the ternary values X, Y, and Z, averages $\mu_x$, $\mu_y$, and $\mu_z$ indicate the group opinions. Here, $n_x$, $n_y$, and $n_x$ are the total frequency of the distribution, and the variances $\sigma_x^2$, $\sigma_y^2$, and $\sigma_z^2$ indicate the degree of aggregation of the opinions.

For example, in a case where n individuals take a vote for each of the ternary values X, Y, and Z, $n=n_x=n_y=n_z$ is satisfied. When cumulative votes, score votes, or the like weighted to the ternary values X, Y, and Z are performed or when weighted totalization for respecting minority opinions is performed, or the like, normally, $n \neq n_x \neq n_y \neq n_z$ is satisfied. As the weights $m_x$, $m_y$, and $m_z$ of the group opinions $\mu_x$, $\mu_y$, and $\mu_z$, $n_x$, $n_y$, and $n_z$, or $n_x/\sigma_x$, $n_y/\sigma_y$, and $n_z/\sigma_z$, and the like can be used, respectively.

In the server 210, the facilitator confirms the point P64 indicating the group consensus possibility point with the line segments L61, L62, and L63 indicating the positioning of the group opinions $p_x$, $p_y$, and $p_z$ on the ternary graph 60 with good visibility, and can further refer to the option corresponding to the point P64 which is the group consensus possibility point among the options regarding the ternary values X, Y, and Z simplified in the ternary graph 60.

Here, the meaning of the size of the equilateral triangle T65 formed by the group opinions $\mu_x$, $\mu_y$, and $\mu_z$ will be described. If there is a tradeoff or trilemma between the ternary values X, Y, Z, then there are few options $v_x'$, $v_y'$, $v_x'$ corresponding to a large sized (for example, all the values X, Y, and Z take values close to a maximum value.) equilateral triangle T65.

Accordingly, as the size of the equilateral triangle T65 is smaller, it is easier to find options that can be consent, and it is easier to perform facilitation for achieving consensus. That is, it can be said that information for consensus building can be given depending on the size of the equilateral triangle T65.

Similarly, for the equilateral triangle T55 formed by the individual opinions $i_x$, $i_y$, and $i_x$ illustrated in FIG. 3, the smaller the size is, the easier it is to correspond to the options. In other words, concluded opinions are meant for the individuals. That is, it can be said that in accordance with the size of the equilateral triangle T55, it is possible to give information serving as a standard when an individual selects an opinion.

Next, FIG. 9 illustrates three types of display examples of a ternary graph simultaneously indicating individual opinions and group opinions. This ternary graph can be displayed on the user I/F 150 of the IoH device 110 or the user I/F 250 of the server 210 in the consensus building support system 100.

In response to end of the totalization of the group opinions $\mu_x$, $\mu_y$, and $\mu_z$ by the server 210, the IoH device 110 of each individual reads the totalization information from the storage 240 or the database 270 of the server 210 via the network 170, and displays an equilateral triangle T65 indicating the group opinions $\mu_x$, $\mu_y$, and $\mu_z$ and the point P64 indicating the center of gravity on the user I/F 150 in addition to the equilateral triangle T55 indicating the opinions $i_x$, $i_y$, and $i_z$ and the point P54 that is a center of gravity through the individual opinion display process S3 and the individual opinion aggregation point display process S4.

In the user I/F 150 of the IoH device 110, an individual can recognize the own position in the group by comparing the own opinions $i_x$, $i_y$, and $i_z$ with the group opinions $\mu_x$, $\mu_y$, and $\mu_z$. For example, when the ternary graph on the left side of FIG. 9 is displayed, it is possible to recognize that the own opinions are relatively close to the group opinions. When the ternary graph in the middle of FIG. 9 is displayed, it is possible to recognize that the group opinions are considered importance on the values Y and Z, whereas the own considers the value X to be important. Furthermore, when the ternary graph on the right side of FIG. 9 is displayed, it is possible to recognize that the own opinions deviate from the group opinions.

As a standard regarding the deviation between the individual opinions and the group opinions, for example, a distance between the point P54 that is the center of gravity of the equilateral triangle T55 indicating the individual opinions and a point P64 that is the center of gravity of the equilateral triangle T65 indicating the group opinions, a ratio of an overlapping area of the equilateral triangle T65 to an overlapping area of the equilateral triangle T55, a square root of sum of squares of a distance between each side of the equilateral triangle T65 and each side of the equilateral triangle T55, or the like may be used.

In this way, the individual recognizes the difference between the own opinions and the group opinions, for example, can use the recognition as a trigger for reflection and correction of the opinions for discussion as a foundation for discussion based on the own position as a minority.

On the other hand, as in the IoH device 110 used by an individual, the server 210 also reads the individual opinions $i_x$, $i_y$, and $i_z$ which are the basis of the group opinions $\mu_x$, $\mu_y$, and $\mu_z$ from the storage 240 or the database 270 in response to the end of the totalization of the group opinions $\mu_x$, $\mu_y$, and $\mu_z$, and displays the equilateral triangle T65 indicating the group opinions and the point P64 which is the center of gravity, and the equilateral triangle T55 indicating the certain individual opinions and the point P54 indicating the center of gravity in an overlapping manner on the user I/F 250 through the group opinion display process S13 and the group consensus possibility point display process S14.

In the user I/F 250 of the server 210, when an operator, a facilitator, an adviser, an assessment person, a stakeholder, or the like involved in the consensus building process compares the group opinions $\mu_x$, $\mu_y$, and $\mu_z$ with the certain individual opinions $i_x$, $i_y$, and $i_z$, it is possible to employ extraction of a problem for consensus achievement, feasibility of selection between an individual and a group, recognition of existence of a minority, coordination including a change in options, and the like.

When the ternary graph on the left side of FIG. 9 is displayed, a more specific discussion can proceed based on the fact that the certain individual is close to achieving the consensus. When the ternary graph on the right side of FIG. 9 is displayed, it is possible to obtain a trigger for providing an opportunity to listen to the opinions of the minority having a large deviation from the group opinions, and the like.

Regarding what kind of individual opinions $i_x$, $i_y$, and $i_z$ are adopted in the server 210, for example, it is conceivable to embrace an individual at the foot in the case of a normal distribution, an individual who specifically deviates from the distribution, a minority who distorts the distribution, a minority who intensively votes for a specific value in the case of a cumulative vote, and the like. Individuals who considerably deviate from the group may be extracted using the above-described deviation standard of the opinions.

<Display Example of User I/F Screen 70 Displayed on IoH Device 110>

Figure 10:
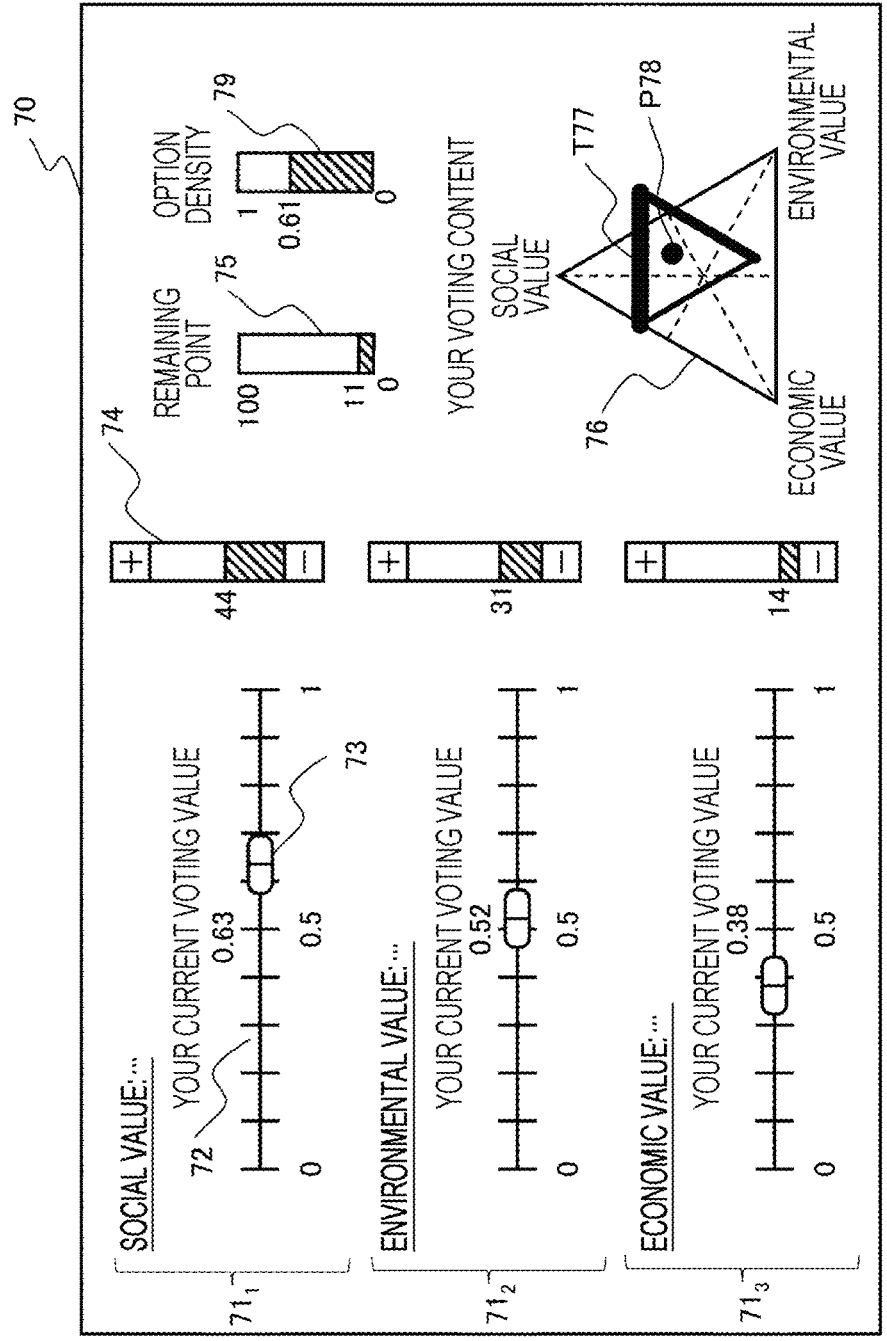
FIG. 10 is a diagram illustrating a display example of a user I/F screen displayed on an IoH device.

Next, FIG. 10 illustrates a display example of the user I/F screen 70 displayed on the user I/F 150 of the IoH device 110 used by an individual.

The IoH device 110 is provided with input fields $71_1$, $71_2$, and $71_3$. A user can use the input fields $71_1$, $71_2$, and $71_3$ to perform the cumulative vote by targeting the ternary values (the social value, the environmental value, and the economic value).

For example, when a character string "social value L . . . " in the input field $71_1$ is clicked, detailed description about the social value is popped up. In order to perform a radix selection and the cumulative vote on the social value, a slider 73 is moved on a scale 72 to select a normalized voting value, and voting points (weights) can be assigned using a + button and a − button above and below a voting point meter 74.

Similarly, the user can select voting values for the environmental value and the economic value using the input fields $71_2$ and $71_3$ and give voting points.

FIG. 10 illustrates a state in which 0.63 is selected as a voting value and 44 is given as a voting point for the social value. For the environmental value, 0.52 is selected as a voting value, and 31 is given as a voting point. For the economic value, 0.38 is selected as a voting value, and 14 is given as a voting point.

The remaining point meter 75 displays the number of remaining points that can be added to the ternary values. In FIG. 10, 11 is illustrated as the number of remaining points. In a ternary graph 76, a voting result of an individual related to the ternary values, that is, an equilateral triangle T77 indicating individual opinion and a point P78 indicating a weighted center of gravity of the equilateral triangle T77 are displayed.

The option density meter 79 displays the relative density of options corresponding to the position of the point P78 indicating the weighted center of gravity of the equilateral triangle T77. In the case of FIG. 10, 0.61 is illustrated as relative density of the options, and the user can ascertain that the current voting content is a relatively feasible selection.

An individual user can intuitively ascertain how the equilateral triangle T77 in the ternary graph 76 changes by changing the voting value for each of the ternary values, how the point P78 indicating the center of gravity moves in accordance with a weight (point) for the ternary values, and how much selection can be realized while operating the slider 73 or the button of the voting point meter 74.

In the cumulative vote, there are a case where the voting points are the number of votes as they are, a case where a square root of the points is the number of votes as in the secondary vote, a case where totalization is performed by weighting the minority, and the like. These are selectively used depending on the specific content of the values.

For example, the social value includes a life satisfaction level, quality of life (QoL), and social capital. However, when races, genders, disabled people, and the like are handled, a voting method in which a minority is considered is selected. Similarly, the environmental value includes natural energy, $CO_2$ emission, landscapes, and the like, but it is necessary to consider specific stakeholders with regard to culture, religion, and the like. The same applies to cases where, for example, poverty, the gap in wealth, and the gap in income, and the gap in region are handled for the economic value.

<Display Example of User I/F Screen 80 Displayed on Server 210>

Figure 11:
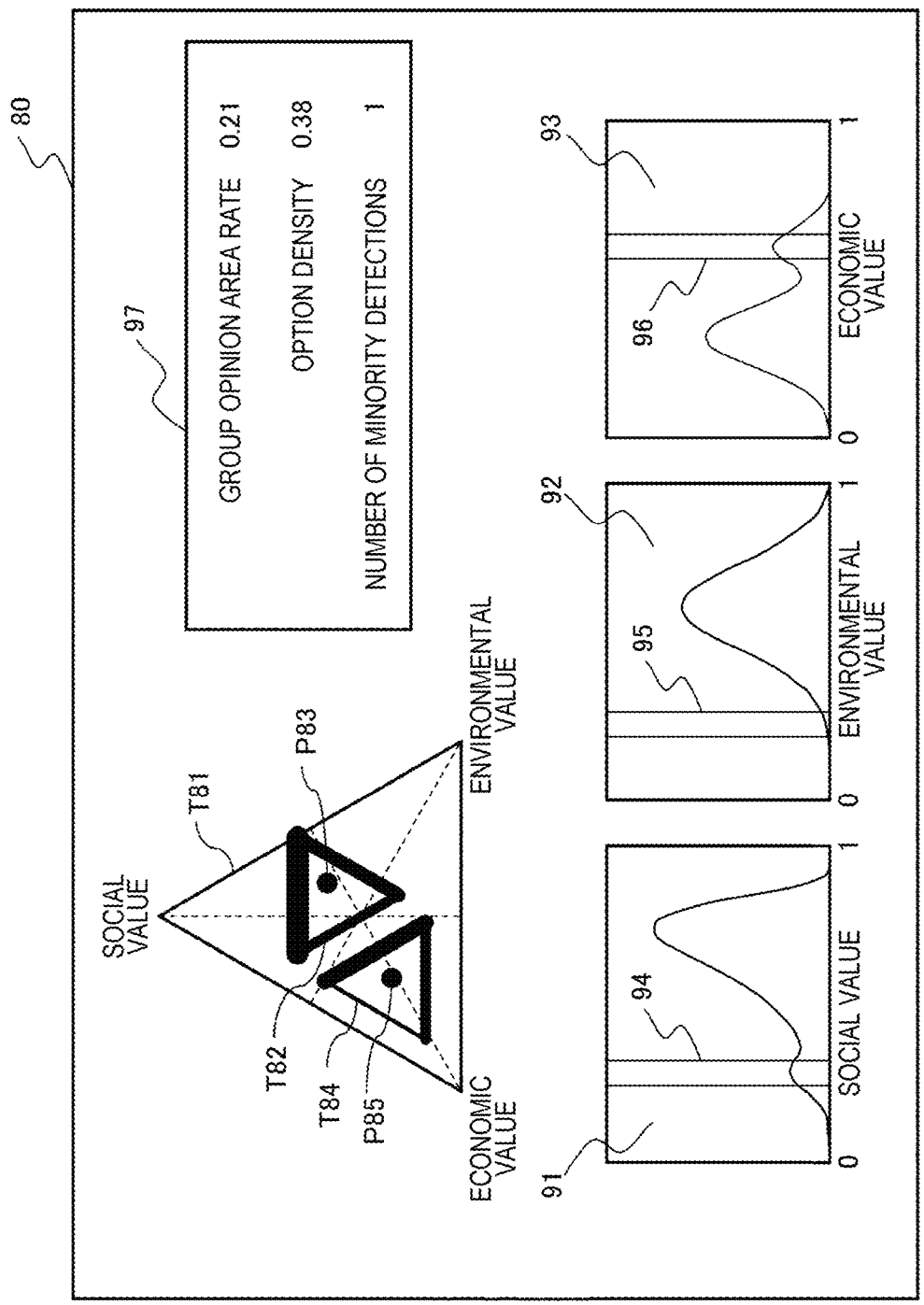
FIG. 11 is a diagram illustrating a display example of a user I/F screen displayed on a server.

Next, FIG. 11 illustrates a display example of the user I/F screen 80 displayed on the user I/F 250 of the server 210.

On the user I/F screen 80, as in FIG. 9, an equilateral triangle T82 indicating a group opinion, a point P83 indicating a weighted center of gravity that is a consensus possibility point, an equilateral triangle T84 indicating a minority (individual) opinion, and a point P85 indicating the weighted center of gravity are displayed on a ternary graph T81 regarding the ternary values (the social value, the environmental value, and the economic value).

The user I/F screen 80 is provided with display regions 91, 92, and 93 indicating a distribution of ternary values. In the display regions 91 to 93, distributions of social value, environmental value, and economic value are displayed. The user can change the positions and widths of the cursors 94, 95, and 96 in the display regions 91 to 93, and the content of the distribution existing in the range of the cursors 94, 95, and 96 is reflected in the ternary graph T81. The cursor 94 to 96 can be changed independently, but can also be changed in conjunction.

The user I/F screen 80 is provided with a display area 97 where a standard for consensus building is displayed. In the display area 97, a group opinion area ratio, an option density, and the number of minority detections are displayed as standards for the consensus building.

The group opinion area ratio is a ratio of the area of the equilateral triangle T82 indicating the group opinions to the area of the ternary graph T81. A small value particularly means one standard indicating that the consensus possibility point can be easily realized when there is a trade-off or trilemma in the ternary values. In the case of FIG. 11, the group opinion area ratio is 0.21, which indicates relatively high feasibility.

The option density is a relative density of feasible options at the position of the consensus possibility point P83. A large value means that there are many options at the position of the consensus possibility point. In the case of FIG. 11, the option density is 0.38, which indicates that there are some feasible options although the option density does not reach the maximum density.

The number of minority detections is calculated based on distortion of the distribution displayed in the display regions 91 to 93, comparison between cumulative vote and one-by-one conversion, and the like. In the case of FIG. 11, the number of minority detections is 1, which corresponds to distortion of the economic value distribution shown in the display region 93, and the position and range of the cursor 96 in the display region 93 are reflected in the equilateral triangle T84 indicating the opinions of a minority of the individuals and the point P85 indicating the weighted center of gravity.

In the example of FIG. 11, from the equilateral triangle T82, it can be seen that a relatively high social value is selected as the group opinions and is most emphasized, and a high environmental value is subsequently emphasized, and the economic value is not emphasized excessively. From the equilateral triangle T84, it can be seen that in the opinions of the minority regarding the economic value selected with the cursor 96, the high economic value is emphasized most, social value is emphasized secondarily, and the environmental value is relatively ignored.

When such a result is obtained, it is desirable that the facilitator or the like clarify the reason why the opinions of the minority deviate from the group opinions through hearing or discussion, and promote mutual understanding and coordination as facilitation for consensus building.

The user I/F screen 80 illustrated in FIG. 11 may be displayed on the IoH device 110 used by an individual.

<Consensus Place where Consensus Building Support System can be Adopted>

Next, FIG. 12 illustrates a plurality of examples of a consensus place in which the consensus building support system 100 can be adopted.

In a consensus place 300, representatives of the various stakeholders 320$_i$ (where i=1, 2, . . . ), a proceedings program director 330, an adviser 340, and the like are connected to each other by the consensus building support system 100.

The stakeholder 320$_i$ includes an IoH device 110 such as a smartphone, a tablet terminal, a laptop PC, and a desktop PC, and the proceedings program director 330 includes the server 210. In some cases, the server 210 is shared by the advisor 340.

As the stakeholder 320$i$, people involved in the interests are called in accordance with the proceedings. For example, the people are representatives of residents or citizens, representatives of residential areas, incomes, n ages, sexes, races, disorders, or the like, representatives of organizations, NGO, NPO, citizen groups, or the like, representatives of agriculture, forestry, and fishery industry providers, commercial and industrial companies, local companies, non-local companies, representative of organizations, cooperatives thereof, or the like, representatives of public institutions such as local governments, schools, polices, fire departments, transportations, medical cares, or the like, representatives of financial institutions such as banks, institutional investors, or the like.

A chair, a master of ceremonies, a facilitator, an assistant recorder, and the like are applicable to the proceedings program director 330. A neutral expert, an analyst, an assessment performer, or the like applies to the advisor 340.

In the consensus building process in the consensus place 300, opinions of each stakeholder 320$_i$ are acquired by the consensus building support system 100, the opinions are displayed on the IoH device 110 of the stakeholder 320$_i$, and the group opinions collecting the opinions of the stakeholder 320$_i$ are presented to the proceedings program director 330. The proceedings program director 330 can proceed with consensus building while considering consensus of group opinion consensus possibility points and the opinions of the minority and also referring to opinions of the advisors 340 depending on a case.

In the consensus place 300, since the positions of the stakeholders 320$_i$ are treated equally on an annular virtual network by a heterarchy of the consensus building support system 100, it is possible to help aim for consensus of all members at least without rejection or opposition, rather than forcing consensus from a majority or leading members. Accordingly, for example, the present invention can be used for a direct democratic spoke conference including representatives of a relative group, or a so-called conference talk.

As described above, the embodiment can be applied in various consensus building processes, and thus the applications are wide. Therefore, all the applications cannot be mentioned. Here, as an application example in the real world, there is a selection of operational measures related to representative ternary values of a social value (a regional economic circulation rate, that is, a regional activation rate), an environmental value (a natural energy use rate), and an economic value (an energy cost ratio) in a local community.

Next, FIG. 13 illustrates a ternary graph in which calculation simulation results of options regarding these values are mapped.

In the consensus building process, the individual opinions regarding the ternary values are collected, and the group opinions are put together as to whether to emphasize the economic value, the environmental value, or keep a balance with social value, or the like.

As another application destination, there is a selection of an operation method for the social value (deduction to descendants and others), the environmental value (distribution of natural resources), and the economic value (distribution of benefits) in a mutual aid community. This operational method follows the idea of continuously circulating the blessings from nature and is, so to speak, a social choice for establishing nature, economy, and morals.

Both the above-described two application examples are cases where a social choice is made from radix options regarding multiple values. With permeation of an information technology into the real world, it is considered that there will be an increasing number of scenarios where consensus building for multiple and radix options is required.

Although the embodiment and the modification according to the present invention have been described above, the present invention is not limited to the example of the above-described embodiment, and includes various modifications. For example, an example of the above-described embodiment has been described in detail in order to facilitate understanding of the present invention, and the present invention is not limited to embodiments including all the configurations described herein. A part of a configuration of an example of an embodiment can be replaced with a configuration of another example. In addition, a configuration of another example can be added to a configuration of an example of an embodiment. A part of the configuration of the example of each embodiment can be added, deleted, or replaced with another configuration. Some or all of the above-described configurations, functions, processing units, processing means, and the like may be implemented by hardware, for example, by designing them with integrated circuits. Control lines and information lines in the drawings indicate what is considered to be necessary for description, and do not necessarily indicate all of them. It may be considered that almost all the configurations are connected to each other.

The configuration of the consensus building support system 100 can be classified into more constituents in accordance with the processing content. One constituent can be classified to execute more processes.

REFERENCE SIGNS LIST 70 user I/F screen
$71_1$ to $71_3$ input field
712 input field
713 input field
72 scale
73 slider
74 voting point meter
75 remaining point meter
76 ternary graph
79 option density meter
80 user I/F screen
91 display region
92 display region
93 display region
94 to 96 cursor
97 display region
100 consensus building support system
110 IoH device
120 processor
130 memory
131 ternary value reduction program
132 individual opinion acquisition program
133 individual opinion display program
134 individual opinion aggregation point display program
140 storage
150 user I/F
160 network I/F
170 network
210 server
220 processor
230 memory
231 ternary value reduction program
232 individual opinion collection program
233 group opinion display program
234 group consensus possibility point display program
240 storage
250 user I/F
260 network I/F
270 database
300 consensus place
320$i$ stake holder
330 proceedings program director
340 adviser

The invention claimed is:

1. A consensus building support system, comprising:
a graph generation unit configured to generate a ternary graph based on options regarding ternary values;
an acquisition unit configured to acquire both individual opinions about the options from a plurality of individuals and a group opinion which is an aggregation of a plurality of individual opinions, wherein the individual opinions are input through Internet of Humans (IoH) devices and transmitted to a server through a network; and
a display unit configured to display, on the ternary graph, a triangle formed by three line segments indicating the individual opinions or the group opinions regarding each of the ternary values by indicating each of the individual opinions or the group opinions regarding the ternary values with one line segment,
wherein the display unit is configured to simultaneously display multiple triangles, each triangle representing a different individual's or group's opinion regarding the ternary values, including a triangle indicating the individual opinions and a triangle indicating the group opinion, and
wherein the display unit is configured to update positions of the displayed triangles in real-time as the individual opinions or group opinions change over time to visualize consensus building progress.

2. The consensus building support system according to claim 1, wherein the graph generation unit generates the ternary graph by simplifying the options regarding multiple values.

3. The consensus building support system according to claim 1, wherein the display unit displays, as a center of gravity of the triangle on the ternary graph, at least one of an aggregation point of the individual opinions and a consensus possibility point of the group which is an aggregation point of the group opinions.

4. The consensus building support system according to claim 1, wherein the display unit displays a weight for each of the ternary values with a relative thickness or color of the line segment forming the triangle.

5. The consensus building support system according to claim 1, wherein the display unit displays density of the options on the ternary graph to correspond to a position of a center of gravity of the triangle.

6. The consensus building support system according to claim 1, wherein the display unit simultaneously displays the triangle indicating the individual opinions and a center of gravity of the triangle, and the triangle indicating the group opinions and a center of gravity of the triangle.

7. The consensus building support system according to claim 1, wherein the display unit simultaneously displays the triangle indicating the opinions of a minority of the individuals extracted from the group opinions and a center of gravity of the triangle, and the triangle indicating the group opinions and a center of gravity of the triangle.

8. The consensus building support system according to claim 1, wherein the display unit is configured to display consensus building progress over time.

9. The consensus building support system according to claim 1, wherein the display unit is configured to display a consensus threshold indicator on the ternary graph representing a target level of agreement required between individual opinions or group opinions.

10. The consensus building support system according to claim 1, wherein the display unit is configured to display historical trajectories of how individual opinions or group opinions have changed over multiple rounds of consensus building discussions.

11. The consensus building support system according to claim 1, wherein the display unit is configured to highlight areas of the ternary graph where opinions have converged over time, indicating emerging consensus among participants.

12. The consensus building support system according to claim 1, wherein the acquisition unit is configured to acquire real-time opinion updates during an active consensus building session and the display unit is configured to animate movement of triangles on the ternary graph as opinions change during the session.

* * * * *